UNITED STATES PATENT OFFICE.

JOSEPH CHARLES PETMECKY, OF AUSTIN, TEXAS, ASSIGNOR TO JOSEPH GALES PETMECKY AND HOWELL MALLORY FINCH, OF SAME PLACE.

RUBBER COMPOUND.

SPECIFICATION forming part of Letters Patent No. 626,092, dated May 30, 1899.

Application filed January 24, 1899. Serial No. 703,262. (No specimens.)

*To all whom it may concern:*

Be it known that I, JOSEPH CHARLES PETMECKY, of Austin, in the county of Travis and State of Texas, have invented a new and Improved Rubber Compound, of which the following is a full, clear, and exact description.

The object of my invention is to provide a new and improved rubber compound particularly designed for repairing pneumatic tires, for making various rubber articles air and water tight, and for other purposes.

In order to produce the rubber compound, I proceed as follows: pure rubber (Para gum) is dissolved in bisulfate of carbon or other quick-drying solvent, and to this solution is added ground rubber slightly vulcanized and that will not dissolve by the ordinary rubber solvents, but which thoroughly amalgamates with the aforesaid solution. After thoroughly mixing the solution and the ground rubber by agitation I add to the mixture cut fiber, preferably cotton, of about one-eighth to one-sixteenth of an inch in length, and then mix all thoroughly until the fiber is hardly perceptible in the mixture, which now forms my improved rubber compound.

The fiber incorporated in the mixture gives considerable strength to the compound, which is very serviceable for repairing punctures or wounds in pneumatic tires. For this purpose a quantity of the compound is injected into the tire around and into the wound, the compound on hardening completely closing the puncture without danger of cracking or blowing out on inflating the tire.

A very good result is obtained by using the ingredients in the following proportions: pure rubber, (Para gum,) one hundred and twenty grains; ground rubber, sixty grains; fiber, ten grains; bisulfid carbon, thirteen hundred and seventy-one grains; but I do not limit myself to the proportions stated.

Having thus fully described my invention, I claim as new and desire to secure by Letters Patent—

A viscous compound for repairing pneumatic tires and the like, consisting of pure rubber dissolved in a quick-drying solvent, ground and slightly vulcanized rubber, and cotton fibers, the whole being thoroughly mixed together in about the proportions specified.

JOSEPH CHARLES PETMECKY.

Witnesses:
JAMES V. BERGEN,
JUNIUS H. DANIEL.